(12) United States Patent
Amemiya

(10) Patent No.: US 8,805,013 B2
(45) Date of Patent: Aug. 12, 2014

(54) PATTERN POSITION DETECTING METHOD

(75) Inventor: Shigeru Amemiya, Tokyo (JP)

(73) Assignee: Shinkawa Ltd., Tokyo (JP)

( * ) Notice: Subject to any disclaimer, the term of this patent is extended or adjusted under 35 U.S.C. 154(b) by 94 days.

(21) Appl. No.: 13/524,347

(22) Filed: Jun. 15, 2012

(65) Prior Publication Data

US 2012/0321135 A1 Dec. 20, 2012

(30) Foreign Application Priority Data

Jun. 16, 2011 (JP) ................. 2011-133987

(51) Int. Cl.
*G06K 9/00* (2006.01)
(52) U.S. Cl.
USPC ........................................................ 382/103
(58) Field of Classification Search
None
See application file for complete search history.

(56) References Cited

U.S. PATENT DOCUMENTS

| 8,116,571 | B2 | 2/2012 | Kamei |
| 2005/0201595 | A1 | 9/2005 | Kamei |
| 2008/0304750 | A1 | 12/2008 | Kamei |
| 2009/0087036 | A1 | 4/2009 | Imaoka |

FOREIGN PATENT DOCUMENTS

| JP | 7-193093 | 7/1995 |
| JP | 2004-192603 | 7/2004 |
| JP | 2006-338092 | 12/2006 |
| JP | 2007-329779 | 12/2007 |

OTHER PUBLICATIONS

Hii, A. J. H., et al. "Fast normalized cross correlation for motion tracking using basis functions." Computer methods and programs in biomedicine 82.2 (2006): 144-156.*

\* cited by examiner

*Primary Examiner* — Nirav G Patel
(74) *Attorney, Agent, or Firm* — Katten Muchin Rosenman LLP

(57) ABSTRACT

A pattern position detecting method capable of reducing time for detecting a component position includes: acquiring a model image of a target; dividing the acquired model image into reference images each including a specific pattern; acquiring a detected image of the target; matching origins of the reference images respectively with predetermined positions on the detected image; comparing a region within the detected image with corresponding one of the reference images while moving the origin of the reference image in X and Y directions from the corresponding predetermined position and sequentially acquiring correlation values; integrating the correlation values at respective comparison positions within an integrated XY plane to generate integrated correlation values; and recognizing a value of integrated XY coordinates at a peak of the integrated correlation values as deviation of the specific patterns in the reference images from the predetermined positions of the target within the XY plane.

4 Claims, 14 Drawing Sheets

PATTERN POSITION DETECTING METHOD

CROSS-REFERENCE TO RELATED APPLICATIONS

This application claims priority to Japanese Patent Application No. 2011-133987, which is pending.

BACKGROUND OF THE INVENTION

1. Field of the Invention

The present invention relates to a position detecting method of detecting a pattern position of a detection target.

2. Description of Related Art

Methods of verifying such as a person's face based on an acquired image have been used. One such method that has been proposed, for example, includes normalizing a stored registered image, extracting a feature of the image, and projecting the extracted feature to an identification space with high identifiability. The method further includes similarly normalizing an image to be verified, extracting a feature of the image, projecting the extracted feature to a similar identification space, comparing the features to output a verification score, and performing verification according to this score (see, Japanese Unexamined Patent Application Publication No. 2006-338092, for example).

Other methods for identifying a feature of an image that has been proposed includes dividing of the image. For example, there has been proposed a method of dividing a single original image into nine pieces of 14×18 pixels (252 dimensions), taking a partial image of each size as a feature vector, and performing an analysis for identifying the partial image using a learned sample. This method allows identification with at least a certain degree of accuracy of the learned sample for performing identification of an image, as the number of the dimensions of the feature of an image largely decreases down to 252 as compared to the original image (see Japanese Unexamined Patent Application Publication No. 2004-192603, for example).

Further, there are industrial machines and the like that processes an image of an attachment component or a processed component to perform positioning the component. As one example, such a machine provides a target as a recognition pattern and a positional reference at a position around a semiconductor chip, acquires image data of the target provided on the semiconductor chip using an ITV camera, compares the acquired image with an image of target data that has been previously set, and aligns the position of the semiconductor chip by matching the images (see Japanese Unexamined Patent Application Publication No. H07-193093, for example).

When a position of a component is aligned according to the conventional technique described in Japanese Unexamined Patent Application Publication No. H07-193093, it is necessary to first acquire the image of the component using a camera because the positional alignment is performed by providing a target at a predetermined position around the component as a positional reference and matching an image of the target acquired by a camera with an image of target data that has been previously set. However, there is a case in which a clear image cannot be acquired due to a lighting condition around the component, or an image of the target cannot be acquired for some reason. There is also a case in which accuracy in positioning of the component is reduced when the image of the target is not clear, or the position of the component cannot be determined when the image of the target cannot be acquired, and therefore the assembling machine has to be stopped.

Therefore, as described in Japanese Unexamined Patent Application Publications No. 2006-338092 and No. 2004-192603, more industrial machines have come to employ a method of performing positional alignment of a component by comparing a feature of a component image to determine the component and detecting a position of the component based on the result of the comparison. According to this method, a component does not have to be provided with a target, it is possible to recognize and align a position of the component without a previously provided target, and the component can be recognized and its position can be aligned based on an entire image even if an image around the component is unclear. Therefore, recognition and alignment of the component can be performed more stably and accurately. Additionally, a method of dividing an image is often used so that an image can be identified with less learned samples.

However, it takes long to process the image in order to determine a component based on an acquired image. An industrial machine is required to perform positioning of a component in a short time, and a higher processing speed is demanded as compared to a case of recognizing an individual person based on an image of the person's face. For example, an application of such a method to industrial machines has been restricted because when processing an image by dividing the image, processing time for combining detection scores of the divided images, or for determining which one of the divided images is most suitable for determination and positioning of the component often takes long.

SUMMARY OF THE INVENTION

An object of the present invention is to reduce time required for detecting a position of a component using a simple image processing method.

A pattern position detecting method according to the present invention includes: a model image acquiring step of acquiring a model image of a detection target; a reference image generating step of dividing the acquired model image into a plurality of reference images each including a specific pattern; a detected image acquiring step of acquiring a detected image of the detection target; an origin matching step of aligning origins of the reference images respectively with a plurality of predetermined positions on the detected image; a comparing step of sequentially comparing a detected image section of a region within the detected image corresponding to one of the reference images with the corresponding reference image while displacing the origin of the corresponding reference image in X and Y directions from the corresponding one of the plurality of predetermined positions on the detected image, and sequentially acquiring correlation values between the detected image section and the corresponding reference image; an integrating step of integrating the correlation values between the detected image sections and the corresponding reference images at respective comparison positions within an integrated XY plane to generate integrated correlation values; and a positional deviation recognizing step of recognizing a value of integrated XY coordinates at a peak of the integrated correlation values as indicating positional deviation of the specific patterns included in the reference images from the predetermined positions of the detection target within the XY plane.

Advantageously, the pattern position detecting method according to the present invention further includes: a weight calculating step of calculating weights respectively based on the specific patterns of the corresponding reference images, the weights being used in the integration of the correlation values, wherein in the integrating step, weighted correlation values obtained by multiplying the correlation values by the corresponding weights are added.

It is also advantageous that the pattern position detecting method according to the present invention further includes: a direction calculating step of calculating directions in which the reference images extend, respectively, wherein in the comparing step, the acquired correlation values are filtered by a spatial filter to generate filtered correlation values, in the integrating step, the filtered correlation values are integrated, and the spatial filter is configured to extract the correlation values in the directions in which the corresponding images extend, or that the pattern position detecting method according to the present invention is configured such that the direction calculating step includes a spatial moment calculating step of calculating a spatial moment for the corresponding reference images.

The present invention provides an advantageous effect of reducing time required for detecting a position of a component using a simple image processing.

DETAILED DESCRIPTION OF THE INVENTION

Figure 1:
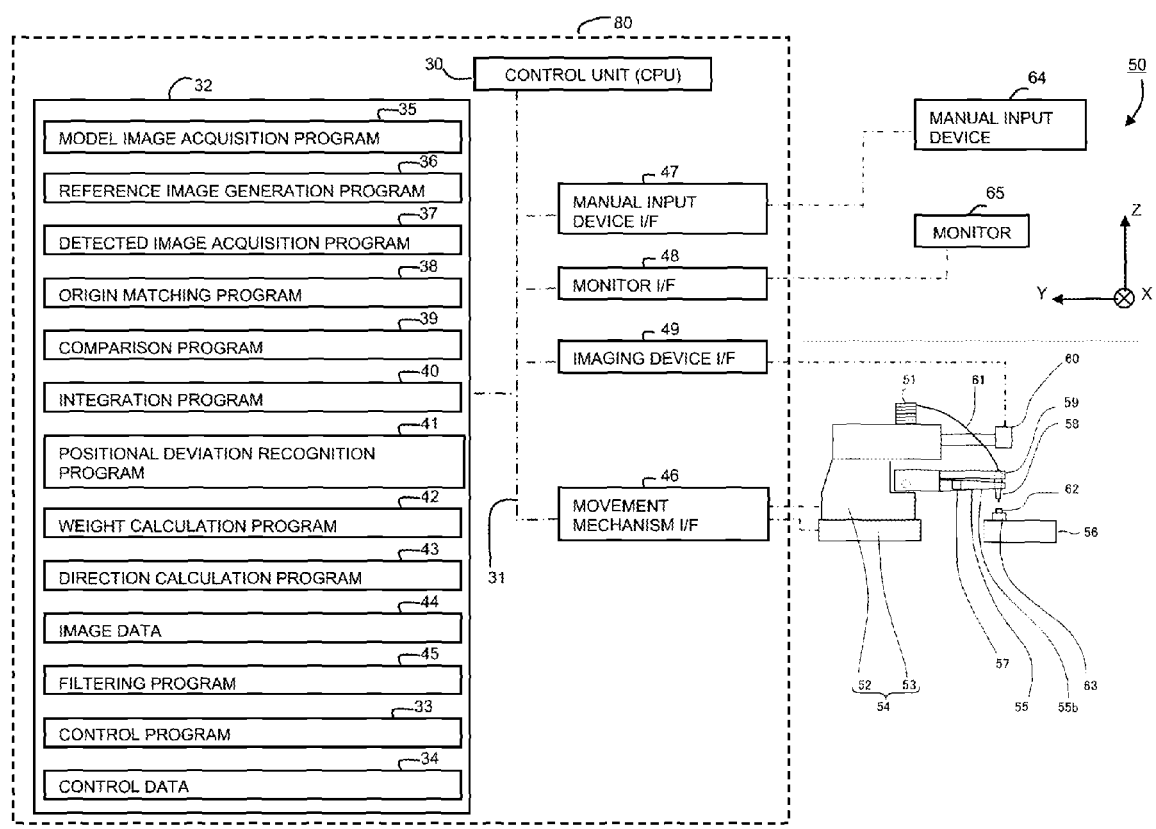
FIG. 1 is a diagram illustrating a configuration of a bonding apparatus that performs a pattern position detecting method according to an embodiment of the present invention.

Hereinafter, an embodiment of the present invention will be described with reference to the drawings. In the following, a case in which positional detection of a semiconductor chip is performed is described as an example. Before describing the embodiment of the present invention, a wire bonding apparatus that performs a method according to the present invention will be described with reference to FIG. 1. In FIG. 1, an alternate long and short dash line represents a signal line. Referring to FIG. 1, a wire bonding apparatus 50 that performs the method of the present invention is configured such that a bonding head 52 is provided on an XY table 53 and a bonding arm 55 is attached to the bonding head 52. The bonding arm 55 is provided with an ultrasonic horn 55b at a tip end of the bonding arm 55, and configured to be driven about a rotary center by a Z motor such that a tip end of the ultrasonic horn 55b moves in an arc toward and away from a pad surface of the semiconductor chip 62. A capillary 58 is attached to the tip end of the ultrasonic horn 55b. The XY table 53 and the bonding head 52 constitute a movement mechanism 54. The movement mechanism 54 is able to move the bonding head 52 freely within a plane along a bonding surface (within an XY plane) using the XY table 53. Driving the bonding arm 55 attached to the bonding head 52 by the Z motor causes the tip end of the ultrasonic horn 55b attached to the tip end of the bonding arm 55 and the capillary 58 attached to the tip end of the ultrasonic horn 55b to move freely in X, Y, and Z directions. A bonding stage 56 for suctioning and fixing a substrate 63 is provided on a side of the tip end of the bonding arm 55 of the XY table 53.

As illustrated in FIG. 1, a wire 61 is fed from a spool 51 attached above the bonding head 52. The ultrasonic horn 55b has a function of supplying an ultrasonic energy generated by an ultrasonic transducer 57 to the capillary 58 to press the wire 61 inserted through the capillary 58 against a pad surface of the semiconductor chip 62 or a lead surface of the substrate 63 to join thereto. The bonding head 52 is provided with a clamper 59 configured to hold and unhold the wire 61 to be inserted through the capillary 58. The clamper 59 moves in the X, Y, and Z directions in conjunction with the bonding arm 55.

As illustrated in FIG. 1, the wire bonding apparatus 50 connects the semiconductor chip 62 to the substrate 63 with the wire 61 by a control unit 30 having a CPU therein detecting a position and controlling movement of each component. The XY table 53 is provided with XY position detecting means for detecting a position of the bonding head 52 in the X and Y directions. The bonding head 52 is provided with a camera 60 as imaging means for acquiring an image of the semiconductor chip 62, the substrate 63, or the like, and configured to detect a position of the semiconductor chip 62 and to perform positioning of the capillary 58 in the X and Y directions based on the image taken by the camera 60. The camera 60 can be configured by such as an imaging device and a lens without a diaphragm or a shutter as long as the camera can acquire an image signal.

The movement mechanism 54 constituted by the XY table 53 and the bonding head 52 is connected to the control unit 30 from a data bus 31 via a movement mechanism interface 46, and the camera 60 is configured to be operated based on a command from the control unit 30 having a CPU via an imaging device interface 49. Further, a monitor 65 that displays an image acquired by the camera 60 and a manual input device 64 that manually changes a position of the bonding head 52 or the camera 60 are connected to the control unit 30 of the wire bonding apparatus 50 respectively via a monitor interface 48 and a manual input device interface 47. The image acquired by the camera 60 is sent to the monitor 65 via the imaging device interface 49, the data bus 31, and the monitor interface 48, and then displayed in the monitor 65. In addition, a signal from the manual input device 64 is transmitted via the manual input device interface 47, the data bus 31, and the movement mechanism interface 46, and causes the XY table 53 or the bonding head 52 to operate.

A storage unit 32 is connected to the data bus 31. The storage unit 32 stores control data 34 necessary for a process of positional detection or an operation for outputting a control command by the control unit 30, and outputs the control data 34 to the control unit 30 or records and stores inputted signal data based on a command from the control unit 30. The control unit 30, the data bus 31, the storage unit 32, and the interfaces 46-49 together constitute a computer 80. The storage unit 32 stores, in addition to the control data 34, a control program 33 that controls bonding control as a whole, as well as a reference image generation program 36, a detected image acquisition program 37, an origin matching program 38, a comparison program 39, a integration program 40, a positional deviation recognition program 41, a weight calculation program 42, a direction calculation program 43, and a filtering program 45 that will be described later. Further, the image acquired by the camera 60 is stored in an image data 44 within the storage unit 32 via the imaging device interface 49 and the data bus 31, and an image that has been processed by the programs 35-43 and 45 are also stored in the image data 44.

The embodiment of the pattern position detecting method by the wire bonding apparatus 50 thus configured will be now described. As shown in Step S101 in FIG. 2, the control unit 30 executes a model image acquisition program 35 shown in FIG. 1 in order to acquire a model image of the semiconductor chip 62 as a detection target. Upon execution of the model image acquisition program 35, an undepicted transfer device for the semiconductor chip 62 is driven to transfer the semiconductor chip 62 to a position for acquiring a model image. The position for acquiring a model image can be a position on the bonding stage 56 on which normal bonding is performed, or can be a position on a separately provided station for acquiring a model image. Upon movement of the semiconductor chip 62 to the position for acquiring a model image, the control unit 30 operates the camera 60 to acquire an image of the semiconductor chip 62, and causes the acquired image to be displayed in the monitor 65.

Figure 3:
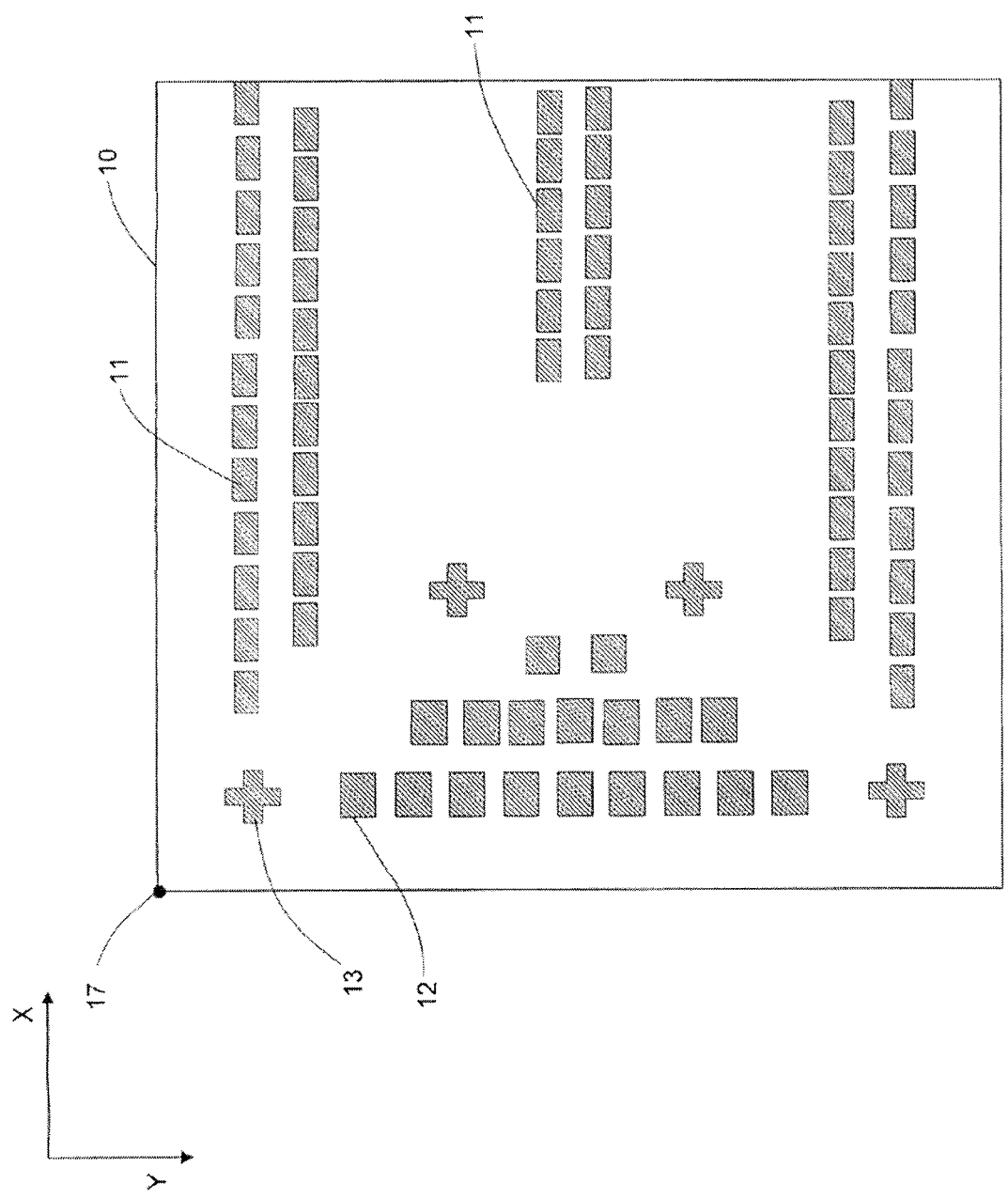
FIG. 3 is a diagram illustrating a model image in the pattern position detecting method according to the embodiment of the present invention.

In the monitor 65, an image 10 of the semiconductor chip 62 is displayed as illustrated in FIG. 3. The image 10 includes laterally rectangular pads 11 that are arranged in two rows along the upper side, two rows in the middle, and two rows along the lower side in the X direction, square pads 12 that are arranged in two rows along the left side in the Y direction, and four position marks 13 in the figure of a cross. A point at an upper left corner of the image 10 is a reference point 17. Here, the rectangular pads 11, the square pads 12, and the position marks 13 are features of the image 10 and specific patterns. The image 10 is about half as large as the semiconductor chip 62, and is not required to be an entire image of the semiconductor chip 62 as long as the image includes the rectangular pads 11, the square pads 12, and the position marks 13 as the features. In this embodiment, an image that covers about a half of the semiconductor chip 62 is displayed in the monitor 65. An operator looks at the image 10 outputted in the monitor 65 to confirm that the image 10 does not include any contamination, has a sufficient image quality as a model image, and includes necessary features. Then, when the operator determines that the image 10 has a sufficient image quality and necessary features, the operator inputs a command to register the image 10 displayed in the monitor 65 as a model image through the manual input device 64. In response to this command, the control unit 30 registers the image 10 displayed in the monitor 65 as a model image, and stores the image 10 in the image data 44 (model image acquiring step).

Alternatively, when the operator determines that the image 10 does not have a sufficient image quality or necessary features, the operator inputs a command to operate the transfer device through the manual input device 64 to correct the position of the semiconductor chip 62 and causes the control unit 30 to execute the model image acquisition program 35 shown in FIG. 1, until the image 10 having a sufficient image quality and necessary features is acquired. Then, when the operator determines that the image 10 has a sufficient image quality and necessary features, the operator inputs the command to register the image 10 displayed in the monitor 65 as a model image through the manual input device 64. In response to this command, the control unit 30 registers the image 10 displayed in the monitor 65 as a model image, and stores the image 10 in the image data 44. While the description of this embodiment is given taking the example in which the operator determines the image quality and presence of the features in the image 10, it is possible to cause the control unit 30 to determine the image quality and the presence of the features in the image 10 and to automatically register the model image.

Figure 2:
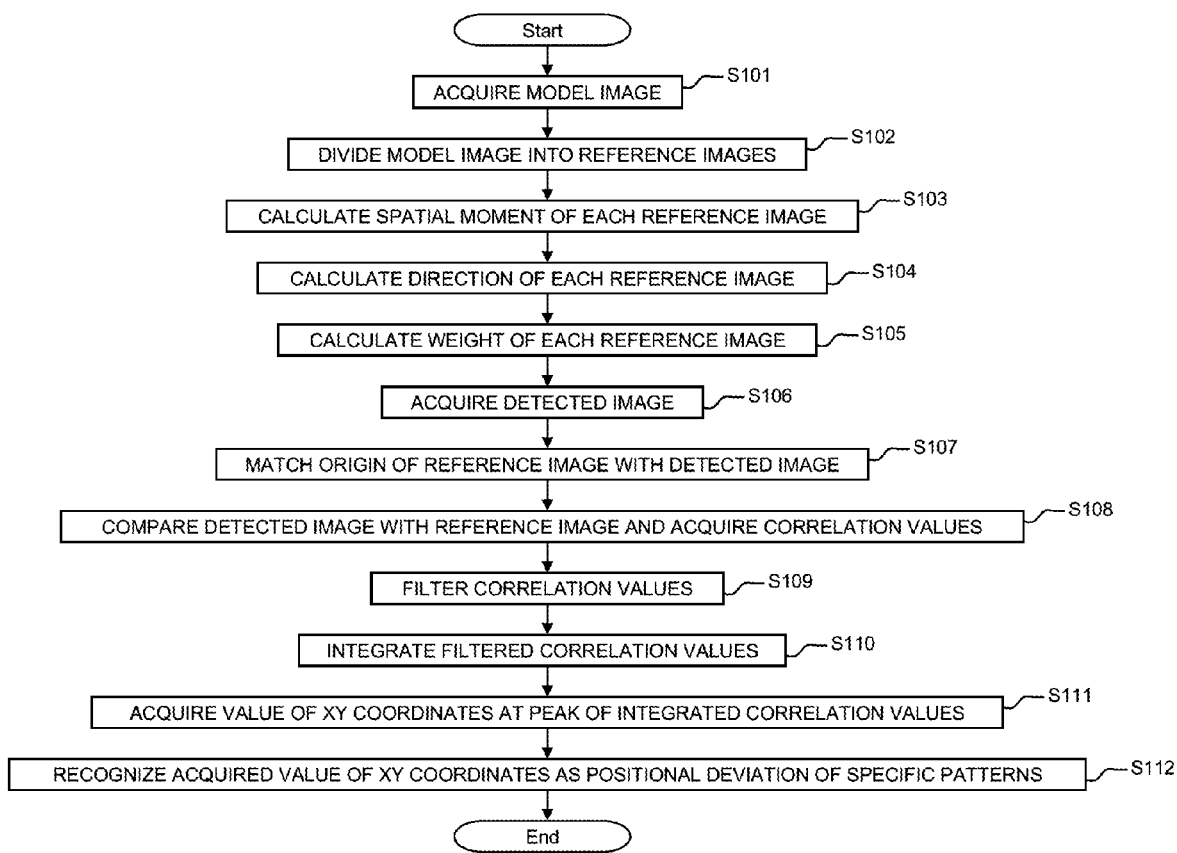
FIG. 2 is a flowchart showing the pattern position detecting method according to the embodiment of the present invention.
Figure 4:
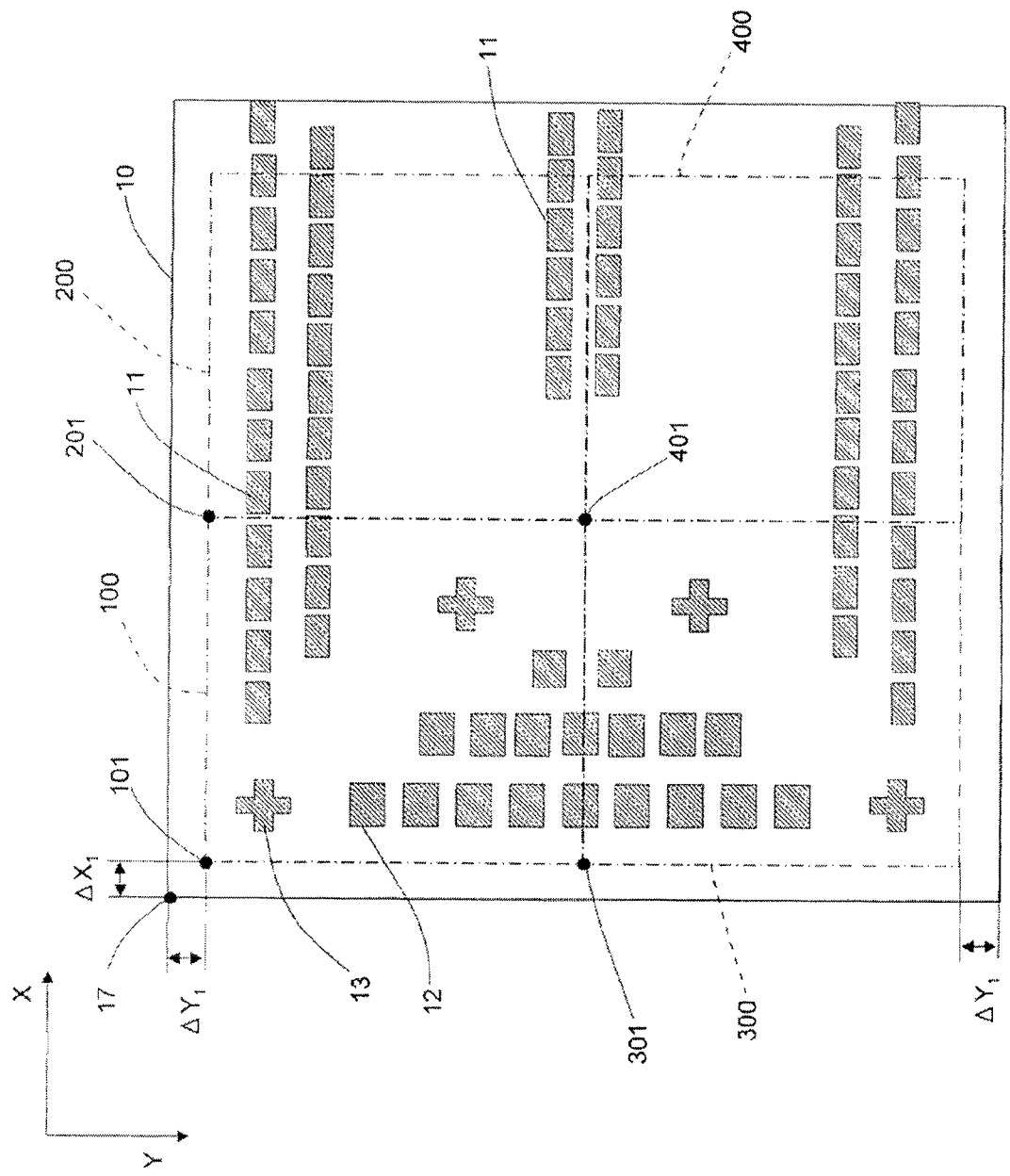
FIG. 4 is a diagram illustrating how the model image is divided in the pattern position detecting method according to the embodiment of the present invention.

As shown in Step S102 in FIG. 2, the control unit 30 executes the reference image generation program 36 shown in FIG. 1 in order to generate reference images. Upon execution of the reference image generation program 36, the control unit 30 performs an operation of dividing the first stored model image into reference images. As illustrated in FIG. 4, the control unit 30 determines the number of images to be divided based on the arrangement of the pads 11 and 12 and the position marks 13 included in the model image, and divides the model image into the determined number of pieces. In this embodiment, the description is given taking a case in which the model image is divided into four pieces to provide four reference images. The number of the division can change depending on the model image, or can be previously determined according to a type of the semiconductor chip 62, or can be manually inputted by the operator through the manual input device 64 based on the image displayed in the monitor 65.

As illustrated in FIG. 4, the control unit 30 reads data of the image 10 registered as the model image from the image data 44, and divides an area defined by an alternate long and short dash line that is displaced in the X direction toward a center of the image 10 by a distance $\Delta X_1$ from the reference point 17 at the upper left corner of the image 10, and an alternate long and short dash line that is displaced in the Y direction toward the center of the image 10 by a distance $\Delta Y_1$ from the reference point 17 into four blocks of the same shape. Accordingly, it is sufficient if a length of each block in the Y direction is shorter than a length derived by subtracting the distance $\Delta Y_1$ from a length of the image 10 in the Y direction and by dividing the resulted length in half, and a length of each block in the X direction is shorter than a length derived by subtracting the distance $\Delta X_1$ from a length of the image 10 in the X direction and by dividing the resulted length in half. These lengths can be determined according to the number of the features included therein. In this embodiment, each of the pads 11 and 12 and the position marks 13 of the semiconductor chip 62 is vertically symmetric (in the Y direction), and horizontal length of the pads 11 (in the X direction) is longer than its length in the Y direction. Further, the blocks are obtained by dividing the area between alternate long and short dash lines displaced toward the center of the image 10 by the distance $\Delta Y_1$ respectively from the upper side and the lower side of the image 10 in half.

Accordingly, the length of each block in the Y direction corresponds to [(the length of the image 10 in the Y direction)−2×(the distance $\Delta Y_1$)]/2.

In this manner, as a result of the division, as illustrated in FIG. 4, the image 10 is divided into four images including a first reference image 100, a second reference image 200, a third reference image 300, and a fourth reference image 400. As illustrated in FIG. 4, there is no gap between the reference images 100-400, and a right side of an outline of the first reference image 100 overlaps with a left side of an outline of the second image 200, and a right side of an outline of the third reference image 300 overlaps with a left side of an outline of the fourth image 400. Similarly, lower sides of the outlines of the first and the second reference images 100 and 200 positioned on the upper side overlap with upper sides of the outlines of the third and the fourth reference images 300 and 400 positioned on the lower side. Further, an origin 101 at an upper left corner of the first reference image 100 is at a position distant from the reference point 17 at the upper left of the image 10 by the distance $\Delta X_1$ in the X direction and by the distance $\Delta Y_1$ in the Y direction.

Figure 5:
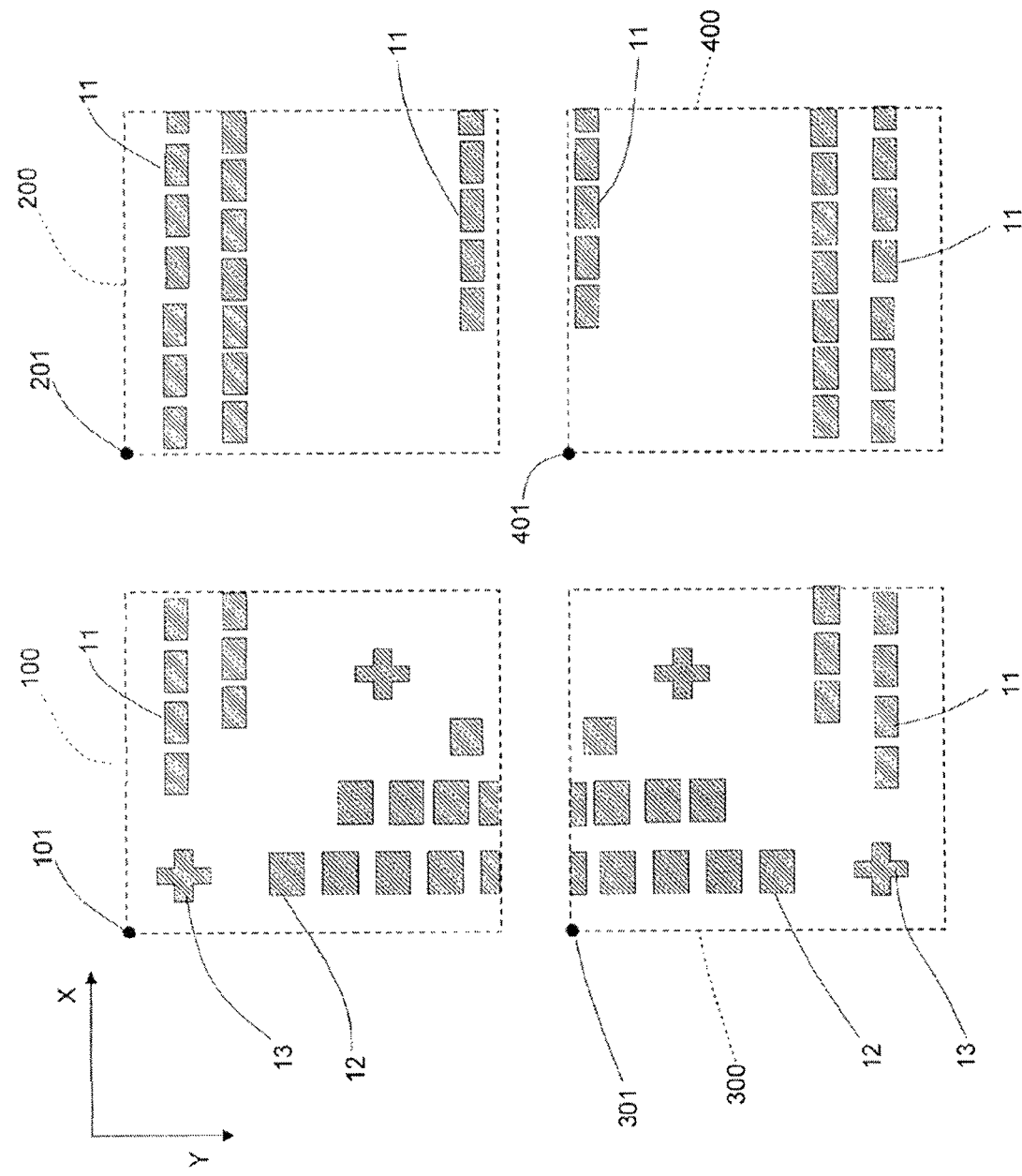
FIG. 5 is a diagram illustrating a reference image in the pattern position detecting method according to the embodiment of the present invention.

Then, the control unit 30 stores the generated reference images 100-400 in the image data 44. As illustrated in FIG. 5, the reference images 100-400 are of the same shape and the same size, and the upper left corners of the reference images 100-400 are the origin 101, 201, 301, and 401 of the reference images 100-400, respectively. The first reference image 100 includes the plurality of rectangular pads 11, the plurality of square pads 12, and the two position marks 13 as the specific patterns. The third reference image is vertically symmetric with the first reference image 100. Further, the second reference image 200 includes the rectangular pads 11 disposed on the upper side of the image 10 and an upper row of the rectangular pads 11 disposed in the middle of the image 10 as the specific patterns, and the fourth reference image 400 is vertically symmetric with the second reference image 200 (reference image generating step).

As shown in Step S103 in FIG. 2, the control unit 30 calculates a spatial moment of each of the reference images 100-400 stored in the image data 44, executes the direction calculation program shown in FIG. 1 to calculate a direction in which each of the reference images 100-400 extends based on the calculated value of the corresponding spatial moment, and stores the result of the calculation in the image data 44. The spatial moments are values indicative of the features of the images, and are expressed by equations 1-4 listed below.

When a pixel value of the reference images 100-400 at coordinates (i, j) is a pixel value f(i, j), a spatial moment $m_{pq}$ of an order (p, q) can be calculated by the following equation:

$$m_{pq} = \sum_i \sum_j i^p j^q f(i, j) \tag{1}$$

The reference images 100-400 are binary images, and a zeroth-order moment $m_{00}$ represents an area of each of the reference images 100-400. Further, a proportion ($m_{10}/m_{00}$) of a first-order moment $m_{10}$ on the X axis to the zeroth-order moment $m_{00}$ and a proportion ($m_{01}/m_{00}$) of a first-order moment $m_{01}$ on the Y axis to the zeroth-order moment $m_{00}$ represent XY coordinates $G(i_G, j_G)$ of a centroid of each of the reference images 100-400. A moment about the centroid is referred in particular as a centroid moment, and given based on the following equation 2:

$$M_{pq} = \sum_i \sum_j (i - i_G)^p (j - j_G)^q f(i, j) \tag{2}$$

Further, a second-order moment is also referred to as an inertia moment, and a second-order centroid moment of each of the reference images 100-400 is given based on the following equation 3, where p=2, q=0 and p=0, and q=2 in the equation 2.

$$M_f = \sum_i \sum_j \{(i - i_G)^2 + (j - j_G)^2\} f(i, j) = M_{02} + M_{20} \tag{3}$$

Assuming that the second-order moments on the X axis and the Y axis when a centroid of each of the reference images 100-400 is taken as an origin in the equations 3 are $\mu_{02}$ and $\mu_{20}$, respectively, a second-order moment about each centroid is expressed by the following equation 4:

$$\mu_2 = \mu_{02} + \mu_{20} = \sum_i \sum_j j^2 f(i, j) + \sum_i \sum_j i^2 f(i, j) \tag{4}$$

As shown in Step S104 in FIG. 2, the control unit 30 executes the direction calculation program shown in FIG. 1 to calculate a slope θ of a principal axis of inertia as a feature amount indicating the direction in which each of the reference images 100-400 extends based on the spatial moment of the corresponding one of the reference images 100-400 calculated based on the equation 1-4, and stores the result of the calculation in the image data 44. The slope θ of the principal axis of inertia is expressed by the following equation 5, where the first-order moment is $\mu_{11}$, the second-order moments on the X axis and the Y axis are $\mu_{02}$ and $\mu_{20}$, respectively (direction calculating step).

$$\theta = \frac{1}{2} \tan^{-1} \left\{ \frac{2\mu_{11}}{\mu_{20} - \mu_{02}} \right\} \tag{5}$$

As shown in Step S105 in FIG. 2, the control unit 30 executes the weight calculation program 42 shown in FIG. 1, calculates the weight of each of the reference images 100-400 based on the feature amount such as the area of each reference image (the zeroth-order moment) calculated based on the expressions 1-5, the centroid position $G(i_G, j_G)$, and the direction in which each reference image extends (the slope θ of the principal axis of inertia). For example, the first and the third reference image 100 and 300 are compared with the second and the fourth reference image 200 and 400. In the first and the third reference image 100 and 300, an area of the pads 11 and 12 and the position marks 13 is larger than that in the second and the fourth reference image, the rectangular pads 11 are arranged in two rows at regular intervals in the X direction, the square pads 12 are arranged in two rows at regular intervals in the Y direction, and the two position marks 13 are aligned along a direction substantially at 45 degrees.

Therefore, the image extends in an oblique direction. By contrast, the specific patterns of the second and the fourth reference image are such that the rectangular pads 11 are arranged in three rows at regular intervals in the X direction, and an area of the image is smaller than that of the first and the third reference image 100 and 300. Therefore, the image extends simply in the X direction. Consequently, when comparing the reference images 100-400 with a different image to identify the different image, the feature amount for identifying the image is larger in the first and the third reference image 100 and 300 than in the second and the fourth reference image 200 and 400, and the identification can be performed more accurately with the first and the third reference image 100 and 300 than with the second and the fourth reference image 200 and 400. Therefore, the weights of the first and the third reference image 100 and 300 are set to be larger than those of the second and the fourth reference image. The weighting can be freely selected depending on the specific patterns included in the reference images 100-400. Upon calculation of the weights of the reference images 100-400, the control unit 30 stores the calculated weights in the image data 44 (weight calculating step).

As described above, after the generation of the reference images 100-400 and the calculation of the directions and the weights of the reference images 100-400 are completed, the control unit 30 performs detection of the position of the semiconductor chip 62 that is actually subjected to the bonding.

Figure 6:
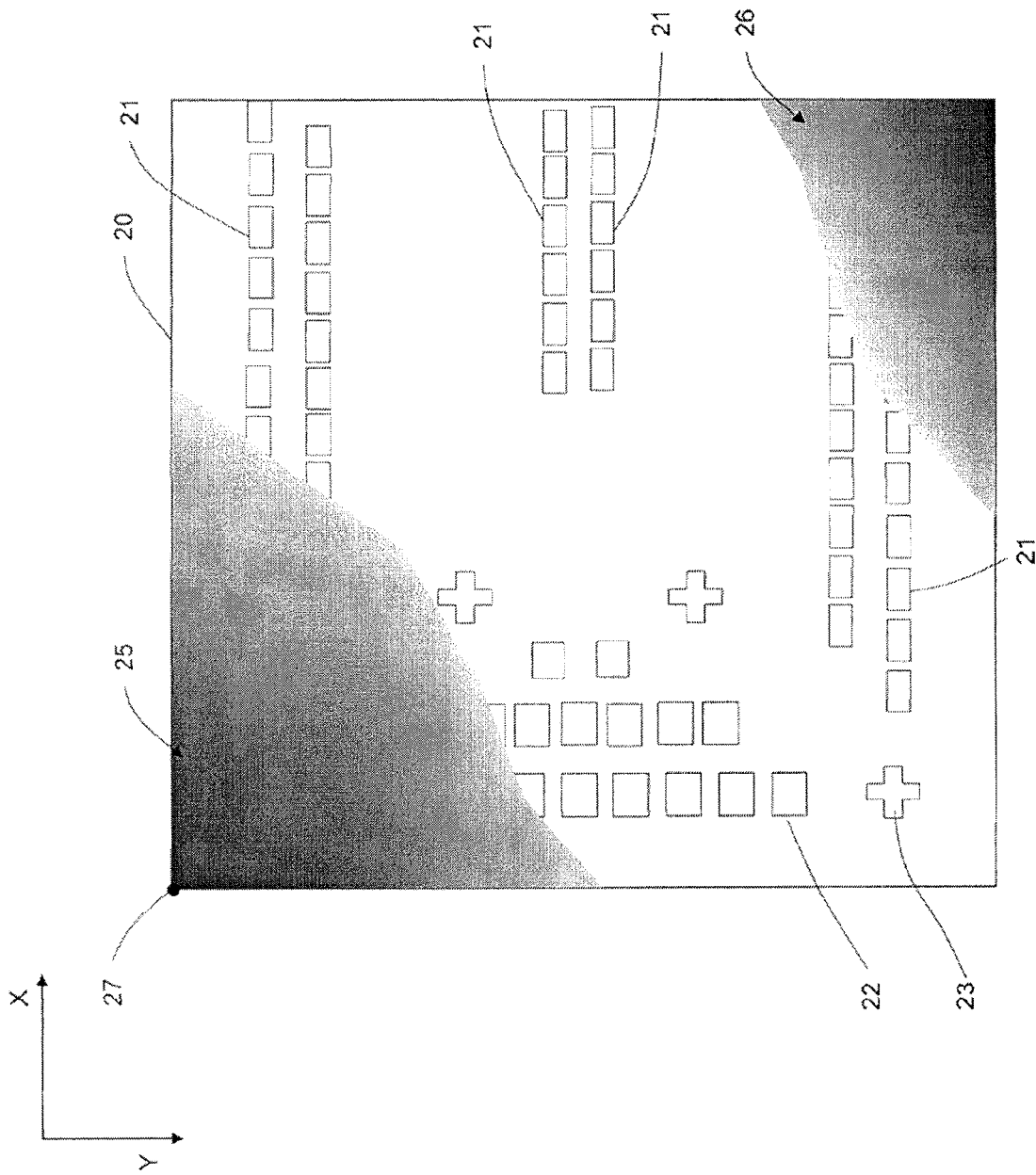
FIG. 6 is a diagram illustrating a detected image in the pattern position detecting method according to the embodiment of the present invention.

As shown in Step S106 in FIG. 2, the control unit 30 executes the detected image acquisition program 37 shown in FIG. 1, and acquires a detected image of the semiconductor chip 62 as the detection target. Upon execution of the detected image acquisition program 37, first, the control unit 30 drives the undepicted transfer device for the semiconductor chip 62 to transfer the semiconductor chip 62 to a bonding position on the bonding stage 56 at which the bonding is performed. Then, the control unit 30 operates the camera 60 to acquire an image of the semiconductor chip 62 as a detected image 20 as shown in FIG. 6, and stores the acquired detected image 20 in the image data 44. The detected image 20 is an image in which rectangular pads 21, square pads 22, and position marks 23 are provided at positions similar to those in the image 10 registered as the model image described above with reference to FIG. 3, and a point at an upper left corner of the image is a first predetermined position 27a (detected image acquiring step).

Depending on the level of contamination on the surface of the semiconductor chip 62 and a position and a direction of lighting, the rectangular pads 21, the square pads 22, and the position marks 23 as the features or the specific patterns included in the detected image 20 are often shown unclearly. In this embodiment, as illustrated in FIG. 6, the detected image 20 has dark spots 25 and 26 on upper right and lower left, and the rectangular pads 21, the square pads 12, and the position marks 13 at these portions are unclear and indistinguishable.

Figure 7:
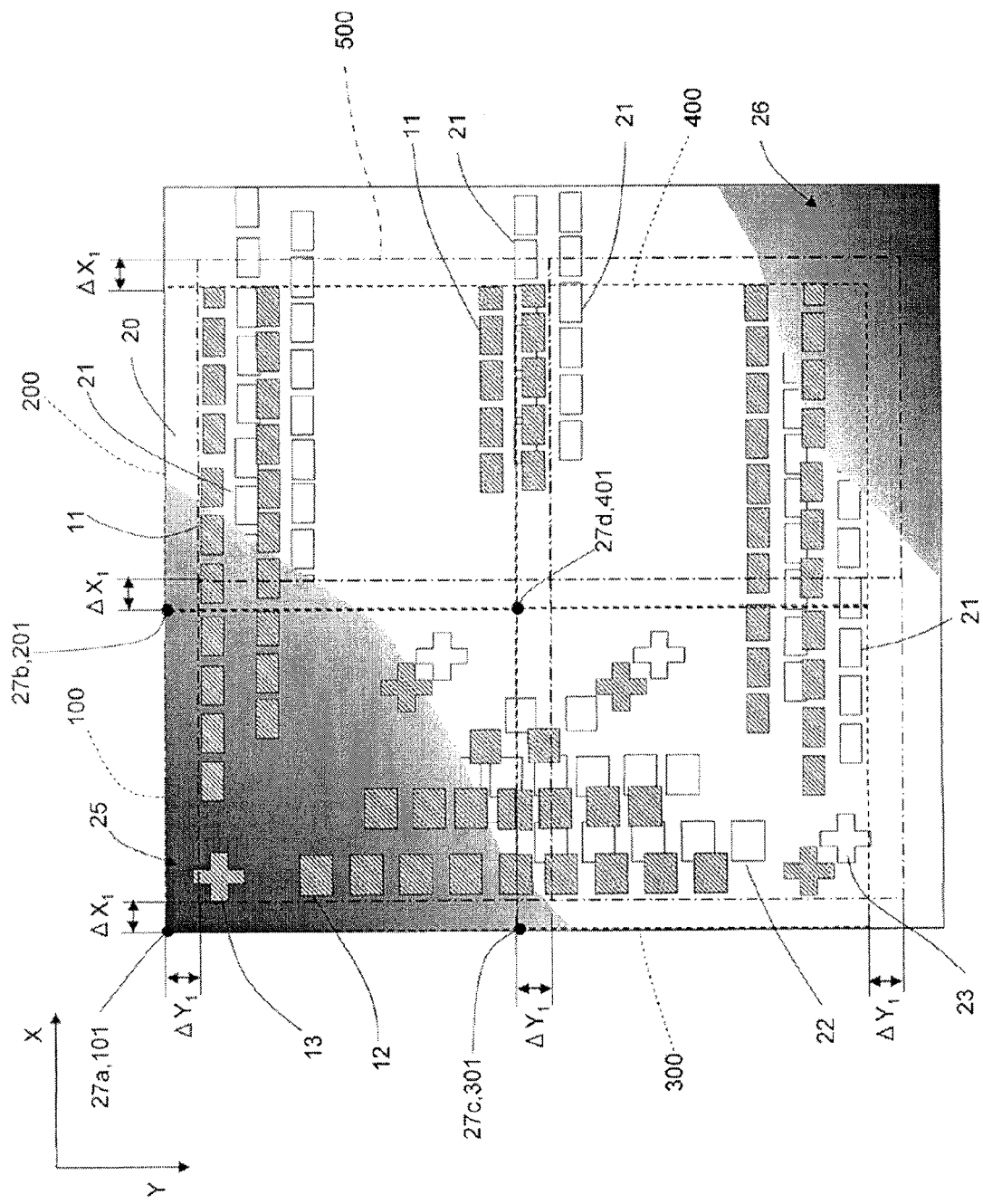
FIG. 7 is a diagram illustrating an origin matching step in the pattern position detecting method according to the embodiment of the present invention.

As shown in Step S107 in FIG. 2, the control unit 30 executes the origin matching program 38 shown in FIG. 1 and overlaps the reference images 100-400 with the acquired detected image 20. Upon execution of the origin matching program 38, as illustrated in FIG. 7, the control unit 30 matches the origin 101 of the first reference image 100 with the first predetermined position 27a of the detected image 20. Then, as illustrated in FIG. 7, the origin 101 of the first reference image 100 comes at a position displaced by the distance $\Delta X_1$ in the X direction and by the distance $\Delta Y_1$ in the Y direction from the position of the origin 101 of the first reference image 100 as described with reference to FIG. 4. Further, as illustrated in FIG. 7, the positions of the rectangular pads 11, the square pads 12, the position marks 13 in each of the reference images 100-400 are displaced by the distance $\Delta X_1$ in the X direction and by the distance $\Delta Y_1$ in the Y direction from positions of the rectangular pads 21, the square pads 22, and the position marks 23 in the detected image 20. Moreover, as described with reference to FIG. 4, the second to fourth reference images 200-400 are provided at the positions such that the reference images 100-400 are arranged without any gap therebetween. Then, as illustrated in FIG. 7, the origins 201-401 of the second to fourth reference images 200-400 are also displaced by the distance $\Delta X_1$ in the X direction and by the distance $\Delta Y_1$ in the Y direction from positions of the origins 201, 301, and 401 of the reference images 200-400 as described with reference to FIG. 4. The positions of the origins 201, 301, and 401 respectively correspond to positions of a second predetermined position 27b, a third predetermined position 27c, and a fourth predetermined position 27d of the detected image 20. Specifically, the reference images 100-400 come at the positions displaced from the positions of the reference images 100-400 by an alternate long and short dash line 500 in FIG. 7 by the same distance both in the X and Y directions (the distance $\Delta X_1$ in the X direction and the distance $\Delta Y_1$ in the Y direction) (origin matching step).

As shown in Step S108 in FIG. 2, the control unit 30 executes the comparison program 39 shown in FIG. 1 and compares the detected image 20 with each of the reference images 100-400 while moving each of the reference images 100-400 relative to the detected image 20 to acquire correlation values. In the following, the comparison between the detected image 20 and the first reference image 100 and the acquisition of the correlation values will be described with reference to FIG. 8. The alternate long and short dash line 500 in FIG. 8 represents the positions of the reference images 100-400.

Figure 8:
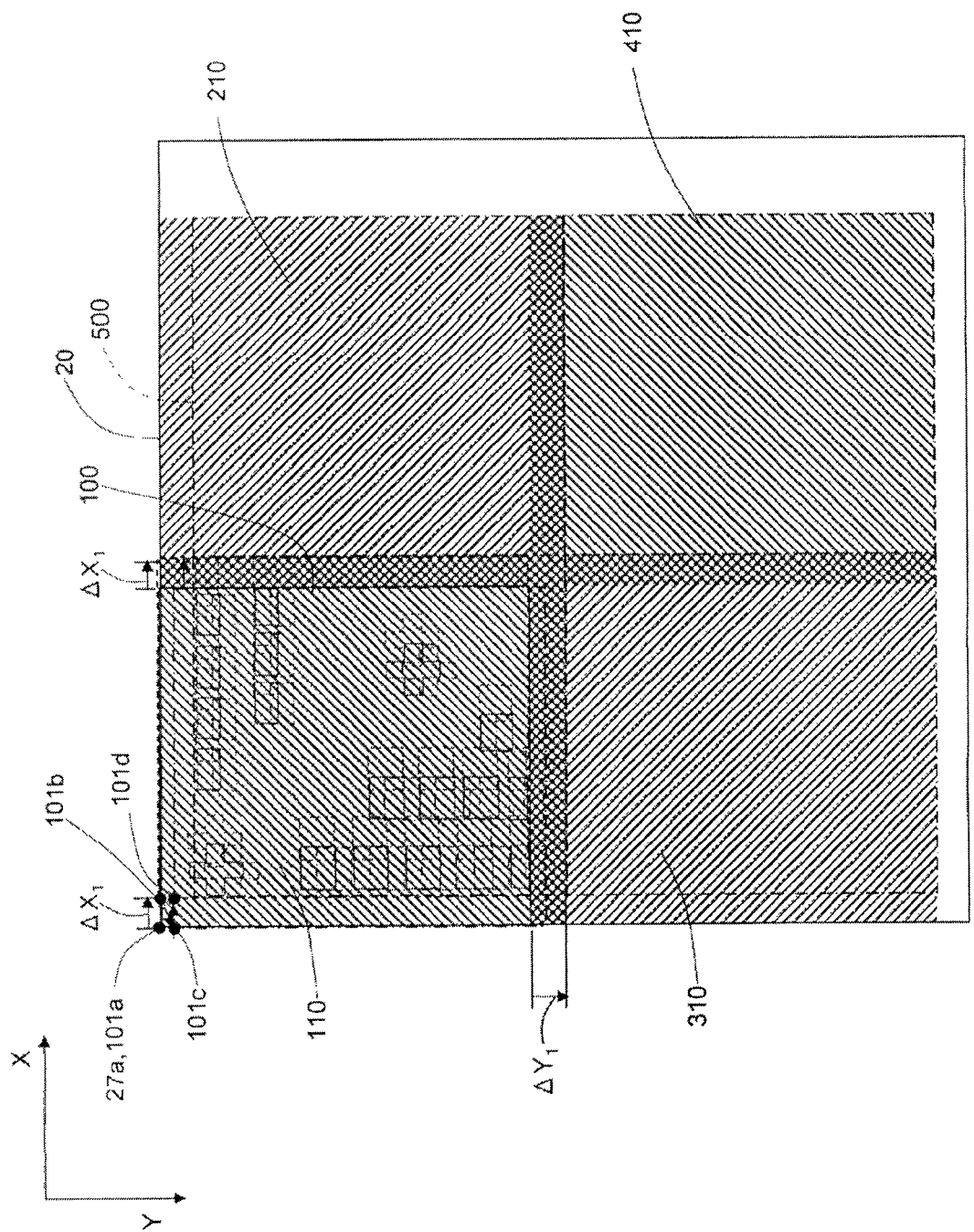
FIG. 8 is a diagram illustrating a comparing step in the pattern position detecting method according to the embodiment of the present invention.

As illustrated in FIG. 8, the control unit 30 matches the origin 101 at the upper left of the first reference image 100 with the first predetermined position 27a at the upper left corner of the detected image 20. The position of the origin 101 of the reference image at this time is indicated by a point 101a in FIG. 8. XY coordinates of this point 101a is (0, 0). As described above, at this position, the positions of the rectangular pads 11, the square pads 12, and the position marks 13 in the first reference image 100 are displaced by the distance $\Delta X_1$ in the X direction and by the distance $\Delta Y_1$ in the Y direction from the positions of the rectangular pads 21, the square pads 22, and the position marks 23 in the detected image 20. Then, the control unit 30 compares the detected image 20 with the first reference image 100 at this position, acquires correlation values therebetween, and stores the acquired correlation values in the image data 44 shown in FIG. 1. Next, the control unit 30 moves the origin 101 of the first reference image 100 from the first predetermined position 27a by 1 pixel in the X direction, and takes XY coordinates (1, 0) as the origin 101 of the first reference image 100. The control unit 30 compares the detected image 20 with the first reference image 100 at this position, acquires correlation values therebetween, and stores the acquired correlation values in the image data 44. In this manner, every time the origin 101 of the reference image 100 is moved by 1 pixel in the X direction, the control unit 30 compares the detected image 20 with the reference image 100, acquires correlation values therebetween, and stores the acquired correlation values in the image data 44.

Subsequently, as illustrated in FIG. 8, after moving the position of the origin 101 of the first reference image 100 by the distance $\Delta X_1$ in the X direction to a point 101b (XY coordinates ($\Delta X_1$, 0)), the control unit 30 moves the position of the origin 101 back to the position of the first predetermined position 27a in the X direction of the detected image 20 and by 1 pixel in the Y direction, and takes XY coordinates (0, 1) as the origin 101. The control unit 30 then compares the detected image 20 with the first reference image 100, acquires correlation values therebetween, and stores the acquired correlation values in the image data 44. Similarly, as described above, every time the first reference image 100 is moved by 1 pixel in the X direction, the control unit 30 compares the detected image 20 with the reference image 100, acquires correlation values therebetween, and stores the acquired correlation values in the image data 44. Then, similarly, as described above, after moving the position of the origin 101 of the first reference image 100 by the distance $\Delta X_1$ in the X direction (XY coordinates is ($\Delta X_1$, 1)), the control unit 30 moves the position of the origin 101 back to the position of the first predetermined position 27a in the X direction of the detected image 20 and further by 1 pixel in the Y direction, and takes XY coordinates (0, 2) as the origin 101. The control unit 30 then compares the detected image 20 with the first reference image 100, acquires correlation values therebetween, and stores the acquired correlation values in the image data 44. In this manner, after moving the origin 101 of the reference image 100 by the distance $\Delta X_1$ in the X direction pixel by pixel, the position of the origin 101 in the X direction is moved back to 0 and moved in the Y direction by 1 pixel, and again moved by the distance $\Delta X_1$ in the X direction pixel by pixel, until the position of the origin 101 reaches XY coordinates ($\Delta X_1$, $\Delta Y_1$). When the position of the origin 101 reaches the XY coordinates ($\Delta X_1$, $\Delta Y_1$), the control unit 30 terminates the comparison between the detected image 20 and the first reference image 100 and the acquisition of the correlation values. As described above, the control unit 30 compares a region 110 (a hatched region in FIG. 8) that is larger than the first reference image 100 in the detected image 20 by the distance $\Delta X_1$ in the X direction and the distance $\Delta Y_1$ in the Y direction with the first reference image 100, and acquires the correlation values. The region 110 is a part of the detected image 20 and corresponds to the first reference image 100.

As illustrated in FIG. 7, regarding the second to fourth reference images, similarly, after moving the origins 201-401 of the reference images 200-400 by the distance $\Delta X_1$ in the X direction pixel by pixel from the predetermined positions 27b-27d that are displaced by the distance $\Delta X_1$ in the X direction and the distance $\Delta Y_1$ in the Y direction from the positions of the origins 201, 301, and 401 of the reference images 200-400 with reference to FIG. 4, the positions of the origins 201-401 in the X direction are moved back to the positions of the predetermined positions 27b-27d in the X direction, that is, the coordinate in the X direction is set back to 0, and moved in the Y direction by 1 pixel, and again moved by the distance $\Delta X_1$ in the X direction pixel by pixel. When the positions of the origins 201-401 reach the XY coordinates ($\Delta X_1$, $\Delta Y_1$), the comparison between the detected image 20 and the reference images 200-400 as well as the acquisition of the correlation values are terminated. As described above, the control unit 30 compares regions 210, 310, and 410 indicated by hatching in FIG. 8 and that are larger than the reference images 200-400 in the detected image 20 by the distance $\Delta X_1$ in the X direction and the distance $\Delta Y_1$ in the Y direction respectively with the reference images 200-400, and acquires the correlation values (comparing step).

The regions 210, 310, and 410 each are a part of the detected image 20 and respectively correspond to the second, the third, and the fourth reference image 200-400. As illustrated in FIG. 8, the right sides of the regions 110 and 310 overlap respectively with the left sides of the regions 210 and 410 by the distance $\Delta X_1$, and the lower sides of the regions 110 and 210 overlap respectively with the upper sides of the regions 310 and 410 by the distance $\Delta Y_1$.

As described above, according to this embodiment, every time each of the origins 101-401 respectively of the reference images 100-400 is displaced by 1 pixel in the X and Y directions from the corresponding one of the plurality of predetermined positions that are displaced by the distance $\Delta X_1$ in the X direction and by the distance $\Delta Y_1$ in the Y direction respectively from the positions of the origins 101-401 of the reference images 100-400 on the detected image 20, the corresponding one of the regions 110-410 respectively larger than the reference images 100-400 in the detected image 20 by the distance $\Delta X_1$ in the X direction and by the distance $\Delta Y_1$ in the Y direction is compared with the corresponding one of the reference images 100-400, and the correlation values are acquired. Therefore, in a case in which the position of the detected image 20 and the position of the image 10 registered as the model image illustrated in FIG. 3 are completely the same, the correlation values between the regions of the detected image 20 and the reference images 100-400 show maximum values at the positions displaced from the origins 101-401 of the reference images 100-400 by the distance $\Delta X_1$ in the X direction and by the distance $\Delta Y_1$ in the Y direction.

Figure 9:
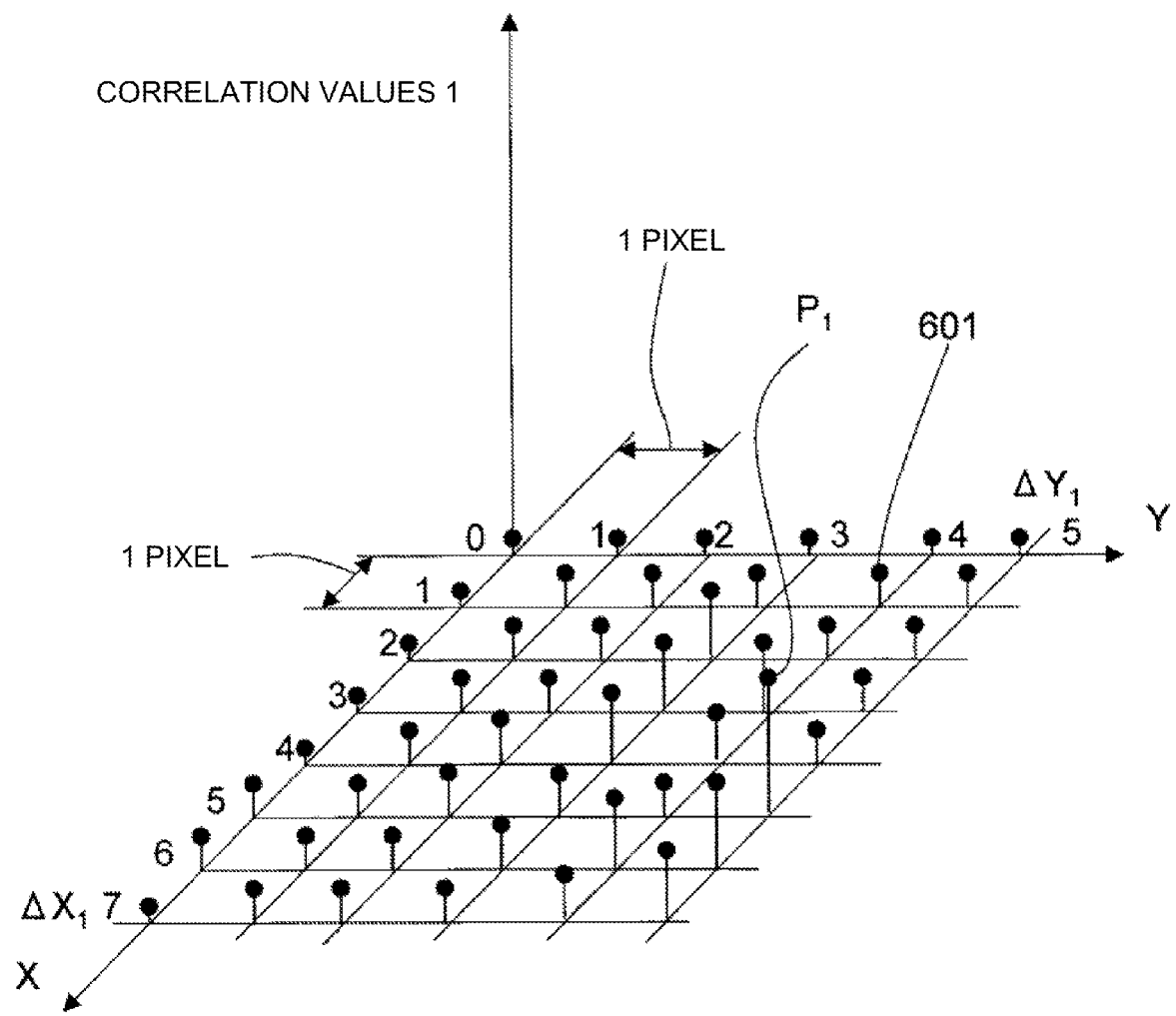
FIG. 9 is a diagram illustrating a distribution of correlation values in the pattern position detecting method according to the embodiment of the present invention.

The correlation values of the reference images 100-400 at XY positions thus acquired are shown in distributions as illustrated in FIG. 9, FIG. 10, FIG. 12, and FIG. 13. In FIG. 9, FIG. 10, FIG. 12, and FIG. 13, the vertical axis indicates a degree of the correlation values between the detected image 20 and each of the reference images 100-400, and a straight line 601 with a circle at a tip end indicates a degree of the correlation value at the corresponding coordinate position. As illustrated in FIG. 9, in the result of the comparison between the first reference image 100 and the region 110 in the detected image 20, the correlation values between the region 110 in the detected image 20 and the first reference image 100 take a first maximum correlation value $P_1$ at XY coordinates (5, 5), a 5th pixel both in the X direction and in the Y direction. However, the distribution is flat in whole, showing no characteristic peak as compared to the distributions of the correlation values between the other reference images and the detected image 20 that will be described later. This is because the region 110 in the detected image 20 illustrated in FIG. 8 does not include many clear images of the rectangular pads 21, the square pads 22, and the position marks 23 due to the dark spot 25 on upper right of the detected image 20, and the correlation values become low at most of the positions.

Figure 10:
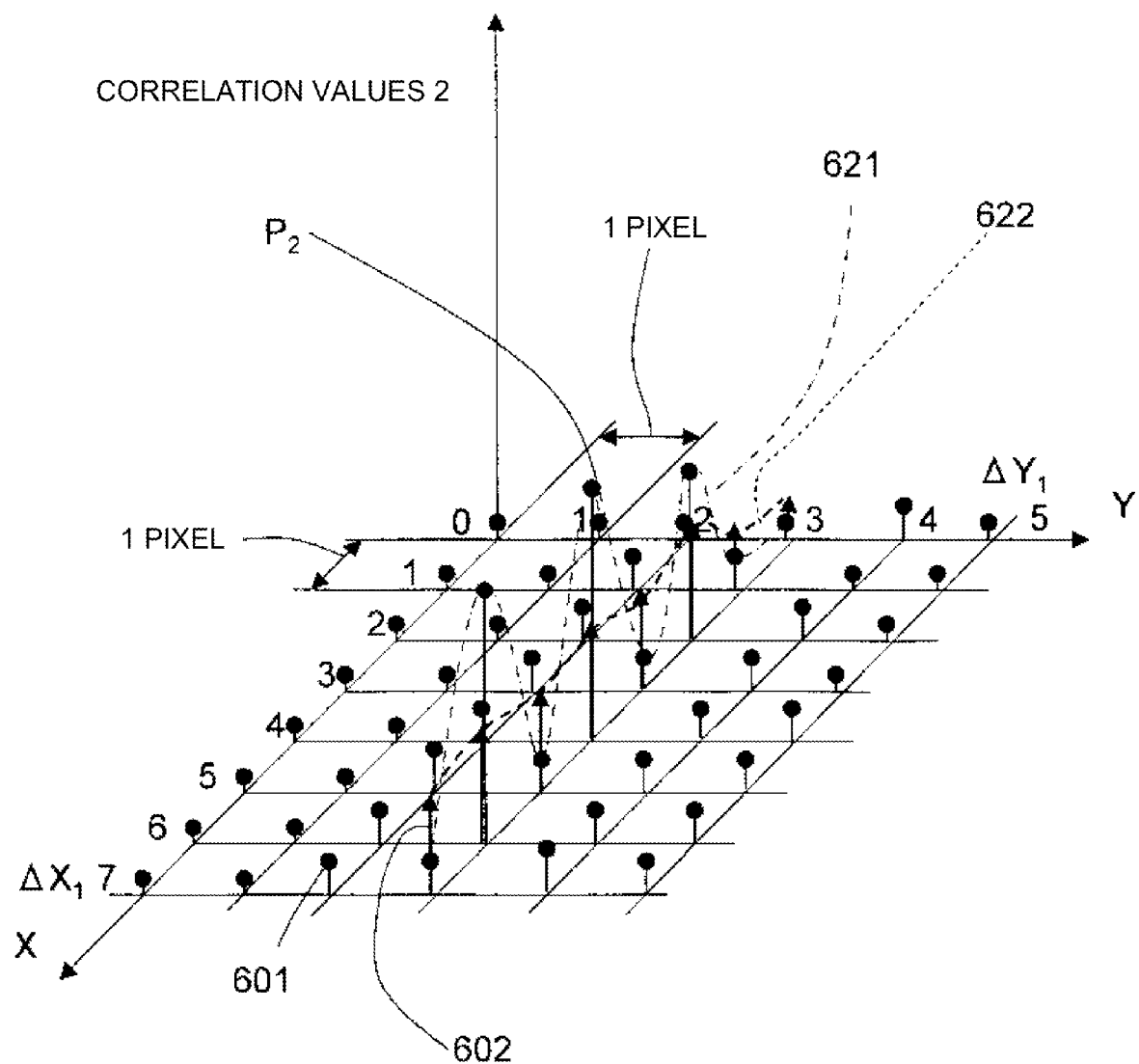
FIG. 10 is a diagram illustrating a distribution of correlation values in the pattern position detecting method according to the embodiment of the present invention.

By contrast, as illustrated in FIG. 10, the distribution of the correlation values in the result of the comparison between the second reference image 200 and the region 210 in the detected image 20 shows undulant peaks at positions at 3rd pixels in the Y direction along the X direction. A line connecting the peak points is indicated as a line 621. This is because, as illustrated in FIG. 5, as the rectangular pads 11 are arranged continuously at regular intervals in the X direction in the second reference image 200, the correlation values increase every pitch of the rectangular pads 11 in the X direction. While the actual pitch between the rectangular pads 11 is far more larger than 2 pixels, the change in the correlation values in FIG. 10 is shown assuming the pitch is 2 pixels as an example. Additionally, there is no peak in the Y direction other than the 3rd pixels. This is because, as an interval in the Y direction between the lines of the rectangular pads 11 is large, the correlation values includes only one peak at one position in the Y direction when comparing the second reference image 200 and the region 210. Further, the peaks along the line 621 indicate different values, and in this embodiment, as illustrated in FIG. 10, the peak at XY coordinates (4, 3), a 4th pixel in the X direction and at a 3rd pixel in the Y direction, is taken as a second maximum correlation value $P_2$.

Figure 13:
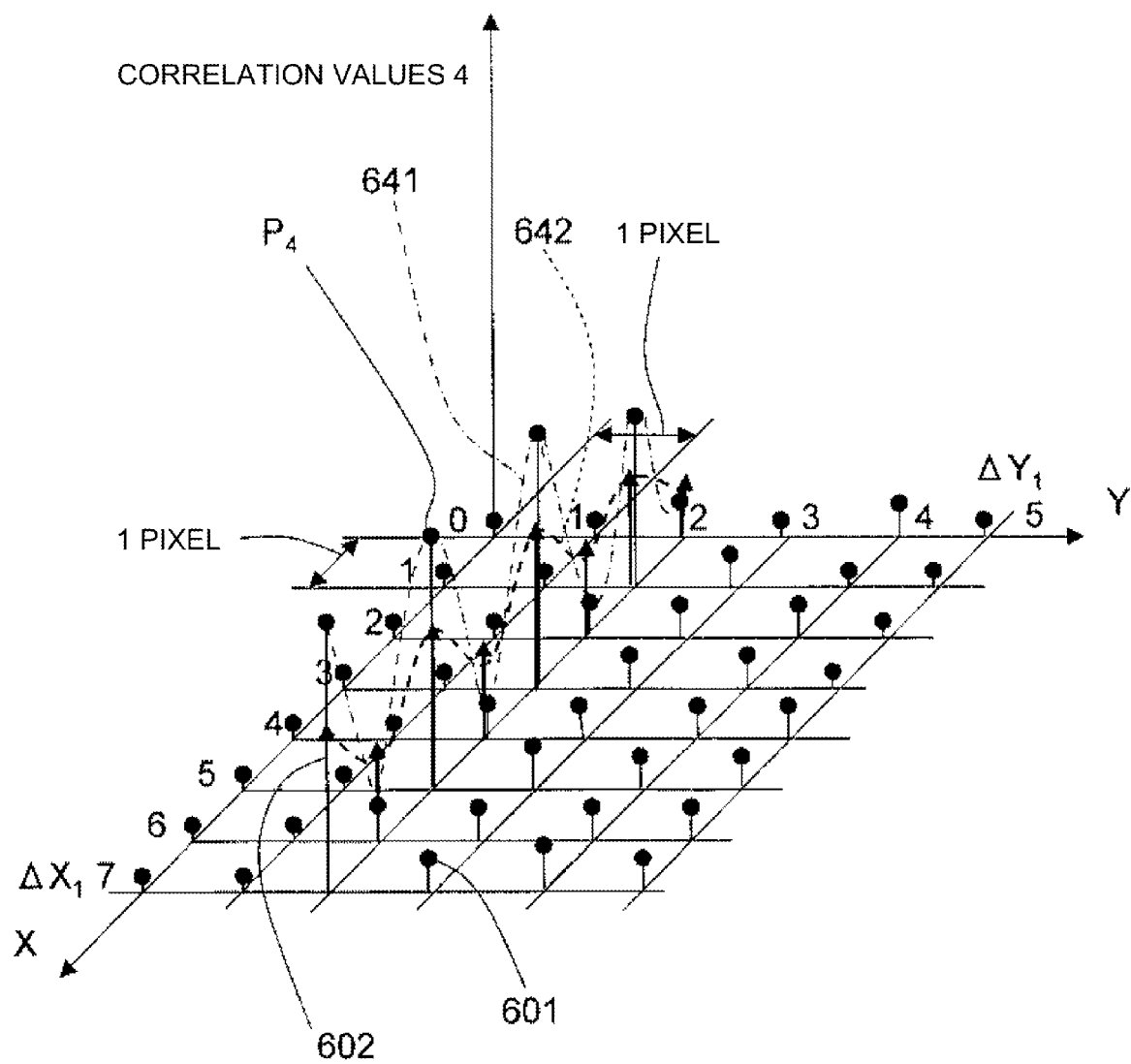
FIG. 13 is a diagram illustrating a distribution of correlation values in the pattern position detecting method according to the embodiment of the present invention.

Moreover, as illustrated in FIG. 13, the fourth reference image 400 having a symmetric specific pattern with the reference image 200 shows the distribution of the correlation values similar to that of the second reference image 200. A difference is that undulant peaks are shown at positions at 2nd pixels in the Y direction along the X direction. A line connecting the peak points is indicated as a line 641. The peaks along the line 641 indicate different values, and in this embodiment, as illustrated in FIG. 13, the peak at XY coordinates (5, 2), at a 5th pixel in the X direction and at a 2nd pixel in the Y direction, is taken as a fourth maximum correlation value $P_4$.

Figure 12:
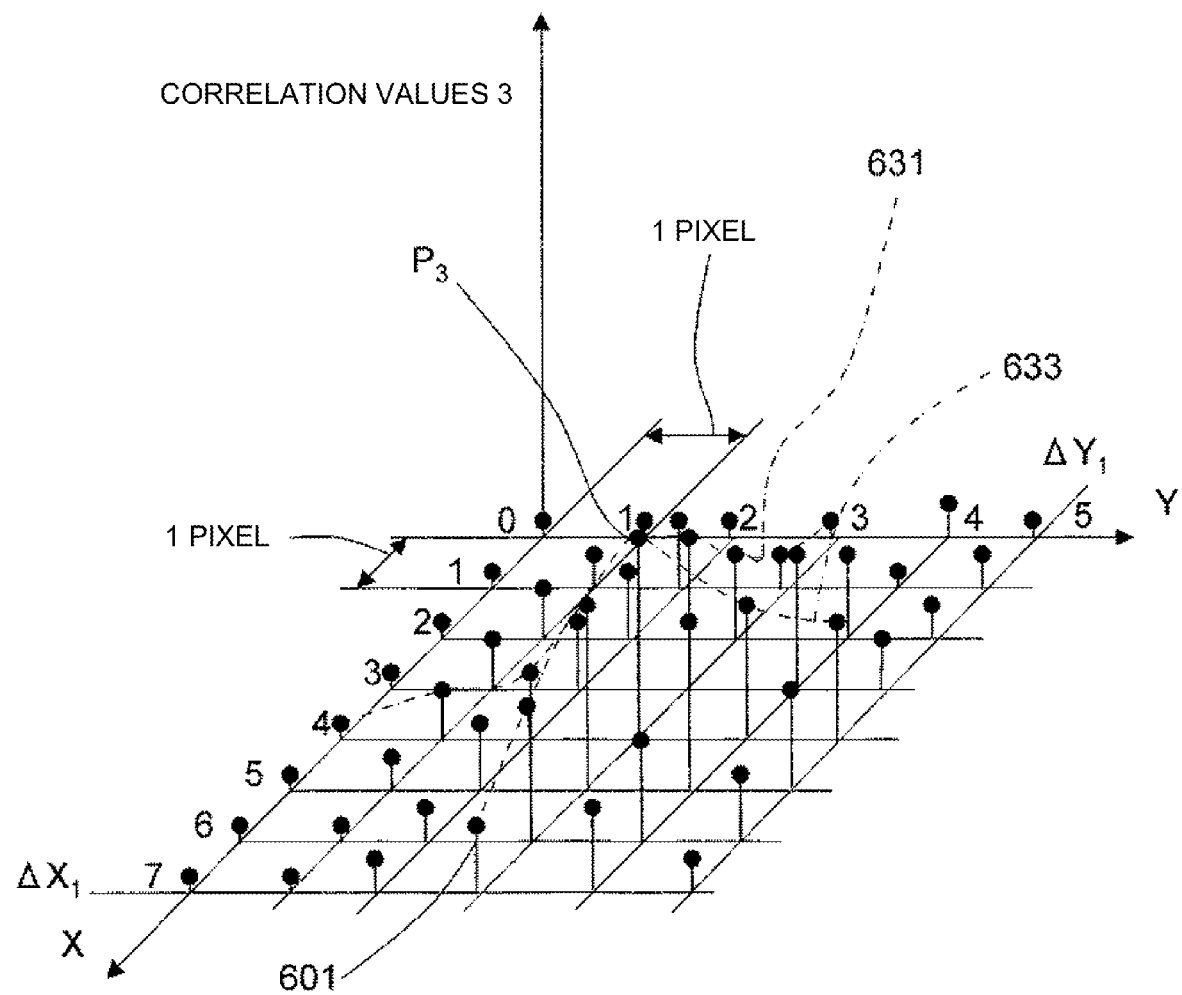
FIG. 12 is a diagram illustrating a distribution of correlation values in the pattern position detecting method according to the embodiment of the present invention.

On the other hand, as illustrated in FIG. 12, the distribution of the correlation values in the result of the comparison between the third reference image 300 and the region 310 in the detected image 20 includes a third maximum correlation value $P_3$ as a large peak of the correlation values at XY coordinates (4, 3), at a 4th pixel in the X direction and a 3rd pixel in the Y direction, and the other correlation values decrease in the X direction and in the Y direction taking this point as an apex. The change in the correlation values in the X direction is indicated by a line 631, and the change in the correlation values in the Y direction is indicated by a line 633. A single peak is provided in this manner because it is possible to compare the specific patterns accurately, as the third reference image 300 has many specific patterns including the rectangular pads 11, the square pads 12, and the position marks 13, and as the region 310 in the detected image 20 does not include the dark spot 25 as in the region 110. As a result, a single large peak of the correlation values appears.

Figure 14:
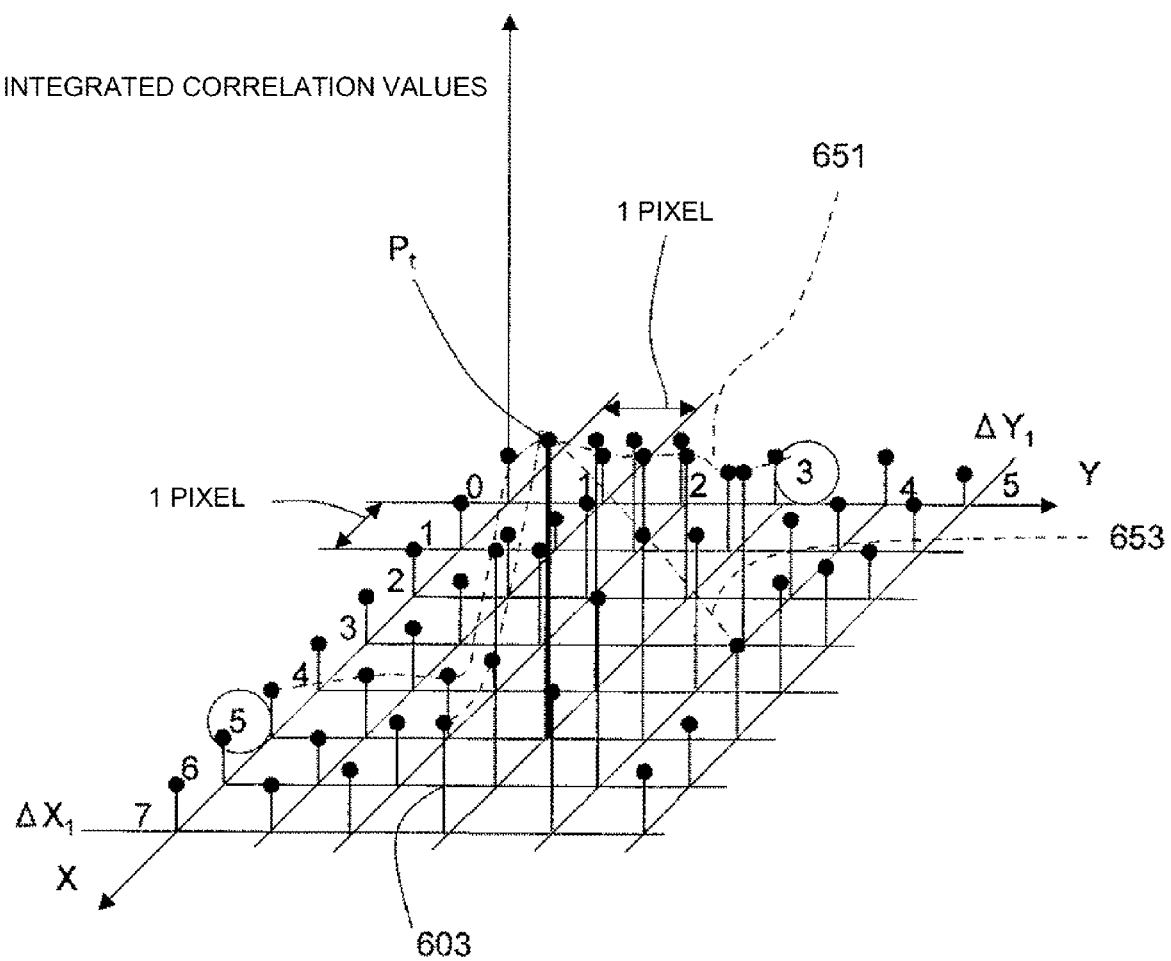
FIG. 14 is a diagram illustrating a distribution of integrated correlation values in the pattern position detecting method according to the embodiment of the present invention.

As described above, in the results of the comparison between the reference images 100-400 and the regions 110-410 in the detected image 20, the XY position of the first maximum correlation value $P_1$ obtained by the comparison between the first reference image 100 and the region 110 is at (5, 5), the XY position of the second maximum correlation value $P_2$ obtained by the comparison between the second reference image 200 and the region 210 is at (4, 3), the XY position of the third maximum correlation value $P_3$ obtained by the comparison between the third reference image 300 and the region 310 is at (4, 3), and the XY position of the fourth maximum correlation value $P_4$ obtained by the comparison between the fourth reference image 400 and the region 410 is at (5, 2). Then, by multiplying the correlation values between the reference images 100-400 and the detected image 20 at XY coordinates shown in FIG. 9, FIG. 10, FIG. 12, and FIG. 13 respectively with the weights of the reference images 100-400 and by adding the obtained values, it is possible to obtain a distribution of integrated correlation values at the XY coordinates as illustrated in FIG. 14. Positions of the XY coordinates at the peaks of the integrated correlation values can be considered as the positions of the specific patterns in the reference images 100-400. However, while the undulant distributions of the correlation values shown by the line 621 and the line 641 in FIG. 10 and FIG. 13 clearly show the positions of the specific patterns in the Y direction, the positions of the specific patterns in the X direction become obscure. Accordingly, as shown in Step S109 in FIG. 2, filtering of the correlation values is performed before integrating the correlation values with other reference images.

Figure 11:
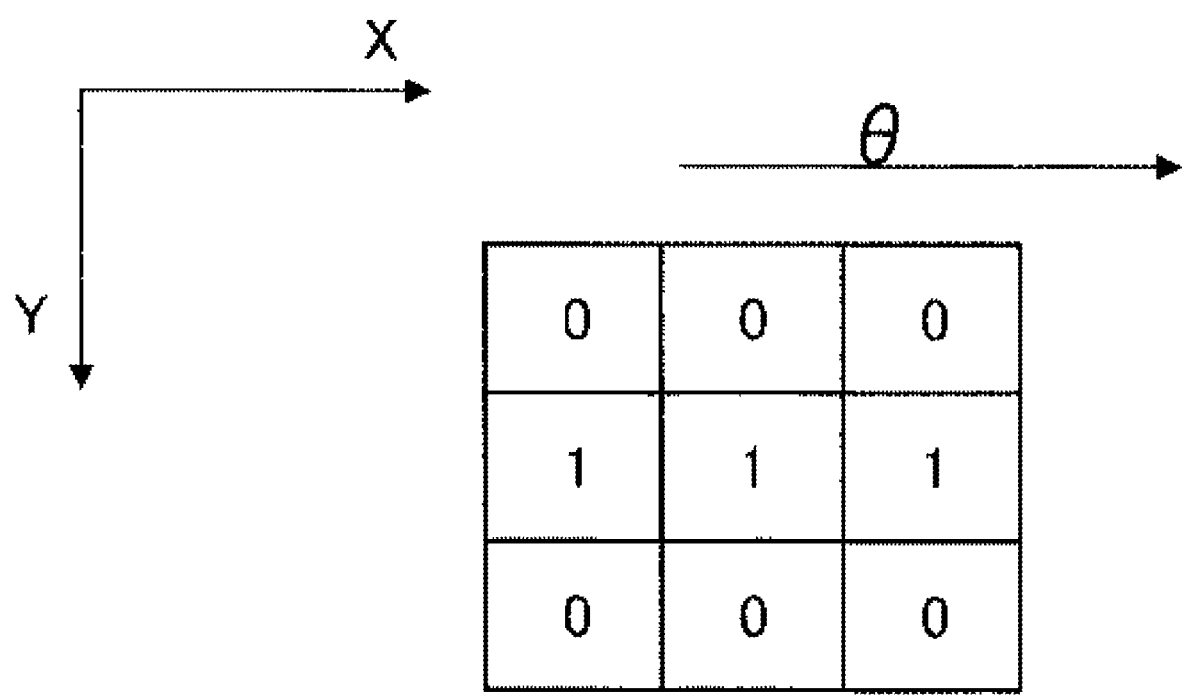
FIG. 11 is a diagram illustrating a spatial filter in the pattern position detecting method according to the embodiment of the present invention.

Here, the filtering of the correlation values between the second and the fourth reference image 200 and 400 and the regions 210 and 410 in the detected image 20 will be described. As described above, in Step S104 in FIG. 2, the control unit 30 calculates the directions respectively in which the reference images 100-400 extend as the slope θ of the principal axis of inertia, and stores the result of the calculation in the image data 44. In a case of the specific patterns in which the rectangular pads 11 are simply arranged at regular intervals in the X direction as in the second reference image 200, the direction in which the image extends is simply the X direction. Therefore, the control unit 30 executes the filtering program 45 shown in FIG. 1, and filters the distribution of the correlation values shown in FIG. 10 by a spatial filter in the X direction as illustrated in FIG. 11. In this case, the spatial filter illustrated in FIG. 11 averages the undulant correlation values in the X direction from that indicated by the line 621 connecting the circles at the tip end of the straight lines 601 into that indicated by a line 622 connecting arrows at tip ends of straight lines 602 as illustrated in FIG. 10. Similarly, the distribution of the correlation values between the fourth reference image 400 and the region 410 of the detected image 20 illustrated in FIG. 13 is averaged from the distribution indicated by the line 641 connecting the circles at the tip end of the straight line 601 into the distribution indicated by a line 642 connecting arrows at tip ends of straight lines 602. Then, the control unit 30 stores the filtered correlation values at the respective XY coordinates in the image data 44. As described above, the filtering of the correlation values of the second reference image 200 and the fourth reference image 400 also applies to other reference images, and the correlation values at the XY coordinates are filtered using the spatial filter in the direction in which the corresponding image extends, and the result of the filtering is stored in the image data 44 (filtering step).

As shown in Step S110 in FIG. 2, the control unit 30 executes the integration program 40 shown in FIG. 1, and multiplies the correlation values between the reference images 100-400 and the regions 110-410 at the corresponding XY coordinate position in the detected image 20 after the filtering the correlation values from the image data 44 respectively by the weights calculated in Step S103 in FIG. 2, and adds the obtained values for the same XY coordinates to obtain integrated correlation value at a common integrated XY coordinate position as shown in FIG. 14, and obtains the distribution of the integrated correlation values. Explaining this step spatially, origins of the four distributions of the correlation values shown in FIG. 9, FIG. 10, FIG. 12, and FIG. 13 are matched with an origin in a common integrated XY coordinate system shown in FIG. 14, and the correlation values at a corresponding one of the XY coordinate positions are respectively multiplied by the weights calculated in Step S103 in FIG. 2, and the obtained values for the same XY coordinates are added (integrating step).

As illustrated in FIG. 14, in the integrated XY coordinate system, an integrated maximum correlation value $P_t$ as a peak of the integrated correlation values is shown at integrated XY coordinates (5, 3), a 5th pixel in the X direction and a 3rd pixel in the Y direction. The integrated correlation values at the integrated XY coordinate positions decrease in the X direction and in the Y direction with this point as an apex. The change in the integrated correlation values in the X direction is indicated by a line 651, and the change in the correlation values in the Y direction is indicated by a line 653. In this manner, as the integrated maximum correlation value $P_t$ is spatially shown as a single sharp peak, the position of the integrated XY coordinates of the peak can be easily obtained.

Then, as shown in Step S111 in FIG. 2, the control unit 30 executes the positional deviation recognition program 41 shown in FIG. 1 to acquire the integrated XY coordinate position of the integrated maximum correlation value $P_t$, and recognizes, as shown in Step S112 in FIG. 2, the positions in the integrated XY coordinate system as deviated positions of the specific patterns in the reference images 100-400. Specifically, taking the case of the first reference image 100, the control unit 30 recognizes that the position of each specific pattern is at a position displaced by 5 pixels in the X direction and by 3 pixels in the Y direction from the position of the origin 101 of the first reference image 100 matched with the first predetermined position 27a of the detected image 20. Similarly, the positions of the specific patterns in the second to fourth reference images 200-400 are recognized to be at positions displaced by 5 pixels in the X direction and by 3 pixels in the Y direction from positions of the second to fourth origins 201-401 of the reference images 200-400 respectively matched with the second to fourth predetermined positions 27b-27d of the detected image 20 (positional deviation recognizing step).

Then, an absolute position of each specific pattern is calculated based on the amount of the positional deviation, and the capillary 58 is moved to the calculated position to perform wire boning. Alternatively, it is possible to calculate a position of the semiconductor chip 62 based on the amount of the positional deviation, and to perform wire boning based on the calculated position.

As described above, according to this embodiment, it is possible to recognize the positional deviation of the specific pattern in a short time using a simple method of adding the correlation values between the reference images 100-400 obtained by dividing the model image and the regions 110-410 in the detected image 20, and therefore an advantageous effect of reducing time for positional detection of the semiconductor chip 62 on the wire bonding apparatus 50 is provided. Further, as the reference images 100-400 obtained by dividing the model image are compared with the detected image 20, it is possible to recognize the positional deviation of the specific pattern with high accuracy even if the detected image 20 includes an unclear portion, and to improve accuracy in the positional detection of the semiconductor chip 62. Moreover, it is possible to reduce detection errors occurring in the addition by multiplying by the weight after filtering each reference image, to recognize the positional deviation of the specific pattern with high accuracy, and to improve accuracy in the positional detection of the semiconductor chip 62.

What is claimed is:

1. A pattern position detecting method, the method comprising:
   (a) acquiring, by a camera, a model image of a detection target;
   (b) dividing, by control unit, the model image into a plurality of reference images, each reference image including a specific pattern and having a position in the detection target;
   (c) acquiring, by the camera a detected image of a detection target, the detected image comprising a plurality of detected image regions, each region divided into a plurality of sections;
   (d) matching, by the control unit, for each reference image the position of the reference image with one of a plurality of predetermined positions on the detected image;
   (e) sequentially comparing, by the control unit, each of the plurality of sections with the corresponding reference image of the plurality of reference images while displacing by the control unit the origin of the corresponding reference image in X and Y directions from the corresponding one of the plurality of predetermined positions on the detected image, and sequentially acquiring correlation values by the control unit between the detected image section and the corresponding reference image;
   (g) integrating, by the control unit, the correlation values between the detected image sections and the corresponding reference images at respective comparison positions within an integrated XY plane to generate integrated correlation values;
   (h) recognizing, by the control unit, a value of integrated XY coordinates at a peak of the integrated correlation values as indicating positional deviation of the specific patterns included in the reference images from the predetermined positions of the detection target within the XY plane; and
   (i) calculating weights, by the control unit, respectively based on the specific patterns of the corresponding reference images, the weights being used in the integration of the correlation values,
   wherein in step (g) weighted correlation values are obtained by multiplying the correlation values by the corresponding weights are added.

2. The pattern position detecting method according to claim 1, further comprises
   wherein step (j) comprises calculating, by the control unit, directions in which the reference images extend, respectively, wherein
   wherein in step (e) the acquired correlation values are filtered by a spatial filter to generate filtered correlation values,
   wherein in step (g) the filtered correlation values are integrated, and
   the spatial filter extracts the correlation values in the directions in which the corresponding images extend.

3. A pattern position detecting method, the method comprising:
   (a) acquiring, by a camera, a model image of a detection target;
   (b) dividing, by a control unit, the model image into a plurality of reference images, each reference image including a specific pattern and having a position in the detection target;
   (c) acquiring, by the camera a detected image of a detection target, the detected image comprising a plurality of detected image regions, each region divided into a plurality of sections;
   (d) matching, by the control unit, for each reference image the position of the reference image with one of a plurality of predetermined positions on the detected image;
   (e) sequentially comparing, by the control unit, each of the plurality of sections with the corresponding reference image of the plurality of reference images while displacing by the control unit the origin of the corresponding reference image in X and Y directions from the corresponding one of the plurality of predetermined positions on the detected image, and sequentially acquiring correlation values by the control unit between the detected image section and the corresponding reference image;
   (g) integrating, by the control unit, the correlation values between the detected image sections and the corresponding reference images at respective comparison positions within an integrated XY plane to generate integrated correlation values;

(h) recognizing, by the control unit, a value of integrated XY coordinates at a peak of the integrated correlation values as indicating positional deviation of the specific patterns included in the reference images from the predetermined positions of the detection target within the XY plane; and (i) calculating, by the control unit, directions in which the reference images extend, respectively, wherein in step (e) the acquired correlation values are filtered by a spatial filter to generate filtered correlation values, wherein in step (g) the filtered correlation values are integrated, and wherein the spatial filter extracts the correlation values in the directions in which the corresponding images extend.

4. The pattern position detecting method according to claim 3, wherein step (i) comprises calculating a spatial moment for the corresponding reference images.

* * * * *